United States Patent [19]

(12) United States Patent
Hon (10) Patent No.: US 10,933,948 B2
(45) Date of Patent: Mar. 2, 2021

(54) INTEGRATED CHAIN ADJUSTMENT SYSTEM AND APPARATUS

(71) Applicant: Charlie R. Hon, Yorba Linda, CA (US)

(72) Inventor: Charlie R. Hon, Yorba Linda, CA (US)

(*) Notice: Subject to any disclaimer, the term of this patent is extended or adjusted under 35 U.S.C. 154(b) by 108 days.

(21) Appl. No.: 14/626,348

(22) Filed: Feb. 19, 2015

(65) Prior Publication Data
US 2016/0244125 A1 Aug. 25, 2016

(51) Int. Cl.
| B62M 9/16 | (2006.01) |
| B62H 3/00 | (2006.01) |
| B62K 25/28 | (2006.01) |
| B62J 23/00 | (2006.01) |

(52) U.S. Cl.
CPC .............. *B62M 9/16* (2013.01); *B62H 3/00* (2013.01); *B62J 23/00* (2013.01); *B62K 25/283* (2013.01)

(58) Field of Classification Search
CPC .............................. B62M 9/16; B62K 25/283
USPC .......................................... 180/231; 474/116
See application file for complete search history.

(56) References Cited

U.S. PATENT DOCUMENTS

| 3,437,162 | A | * | 4/1969 | Cole | B62M 7/00 180/227 |
| 5,007,497 | A | * | 4/1991 | Trema | B62K 25/005 180/219 |
| 5,240,087 | A | * | 8/1993 | Parker | B62M 9/16 180/227 |
| 5,546,665 | A | * | 8/1996 | Jackmauh | G01B 5/255 180/231 |
| 8,827,024 | B1 | * | 9/2014 | Sumi | B62K 25/02 180/227 |
| 2005/0026731 | A1 | * | 2/2005 | Skidmore | B62M 9/16 474/116 |
| 2006/0055147 | A1 | * | 3/2006 | Anzai | B62M 9/16 280/281.1 |
| 2009/0014992 | A1 | * | 1/2009 | Matsuura | B62M 9/16 280/781 |
| 2010/0181742 | A1 | * | 7/2010 | Mori | B62M 9/16 280/284 |

* cited by examiner

*Primary Examiner* — Ruth Ilan
(74) *Attorney, Agent, or Firm* — Steven Rinehart (57) ABSTRACT

A chain adjustment system and apparatus are provided, the chain adjustment apparatus comprising an end cap for a motorcycle swing arm having an elongated adjustment member, two or more mounting portions defining apertures for detachably affixing auxiliary implements, and a housing.

10 Claims, 7 Drawing Sheets

600

Fasteners / bolts 504

Housing 102

Rear stand hook auxiliary member 502

INTEGRATED CHAIN ADJUSTMENT SYSTEM AND APPARATUS

FIELD OF THE INVENTION

This invention relates to an integrated chain adjuster system for adjusting the slack on a chain, and more particularly relates to a chain adjuster cap that integrates into a swing arm of a cycle for facilitating chain adjustment, and enabling the attachment of auxiliary members useful for adjusting the chain and operating the cycle.

BACKGROUND

Description of the Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that motorcycles typically include a frame and a swingarm pivotally connected to the rear of the frame. The swingarm supports the rear axle and rear wheel of the motorcycle. Typically, the rear axle extends through the swingarm, and is secured in place by an axle nut. The positioning of the axle relative to the swingarm can be changed by use of an axle adjuster. More specifically, the axle nut can be loosened and the adjuster can be used to move the rear axle relative to the swingarm to change the tension in the flexible drive member (e.g., a chain or belt).

For protection, portions of the rear axle or adjuster are sometimes covered. For example, rear axles and corresponding axle nuts can be covered with an axle end cap or cover. Similarly, axle adjusters can be covered with an adjuster end cap to enhance the function and aesthetics of the adjuster. Such covers and end caps are commonly brightly polished and/or have ornamental designs or logos. These covers and end caps may also reduce the amount of contaminants that reach and corrode these components.

Nevertheless, traditional chain adjustment cap do allow attachment of auxiliary implements such as sliders or rear stands, nor do traditional end caps provide efficient means of adjusting chain slack.

In view of the foregoing, it is clear that these traditional end caps and chain adjustment mechanisms are not perfect and leave room for more optimal approaches to a chain adjustment cap that adjusts the slack on a chain while also providing additional functionality to a cycle.

SUMMARY

From the foregoing discussion, it should be apparent that a need exists for an integrated chain adjustment system integrates with a cycle for enabling facilitated chain adjustment and providing attachments that add functionality to the cycle.

The present invention has been developed in response to the present state of the art, and in particular, in response to the problems and needs in the art that have not yet been fully solved by currently available apparatus. A swingarm end cap for a motorcycle is provided, the end cap comprising: a housing disposed to detachably integrate with a swing arm of a motorcycle; the housing configured to retain a rear axle in a locked position relative to the swing arm, the housing operatively connected to the rear axle through an adjustment fastener, the adjustment fastener configured to adjust the position of the rear axle in relation to the swing arm for adjustment of tensile force on a chain, the housing further comprising two mounting portions extending rearwardly from the housing, the mounting portions each defining an aperture, the mounting portions collectively configured to enable attachment of at least one auxiliary member; and an elongated adjustment member disposed to extend rearwardly from the housing, the elongated adjustment member configured to enable access to the adjustment fastener.

In some embodiments, the housing connects to the rear axle through a threaded adjustment fastener that adjustably regulates the distance between the housing and the rear axle, as needed, wherein the adjustment fastener passes through a threaded aperture in the rear axle for adjusting the relative distance therebetween.

The housing may form a machined encapsulation that is welded onto the swing arm. The housing may comprise a front end, a rear end, a left end, and a right end.

In various embodiments, the housing is configured to integrate on a brake side and a sprocket side of the motorcycle. The elongated adjustment member may comprise a bolt shaped tube disposed to extend from the housing. The elongated adjustment member may define an adjustment opening configured to enable entry of a tool for engaging a terminal end of the adjustment fastener.

In some embodiment, the adjustment fastener comprises a threaded screw. The at least one auxiliary member may comprise a swing arm slider configured to form a barrier adjacent to the housing for at least partially protecting the swing arm, the rear axle, and the chain.

In other embodiments, the at least one auxiliary member comprises a rear stand hook configured to enable a stand to support a rear section of the cycle.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
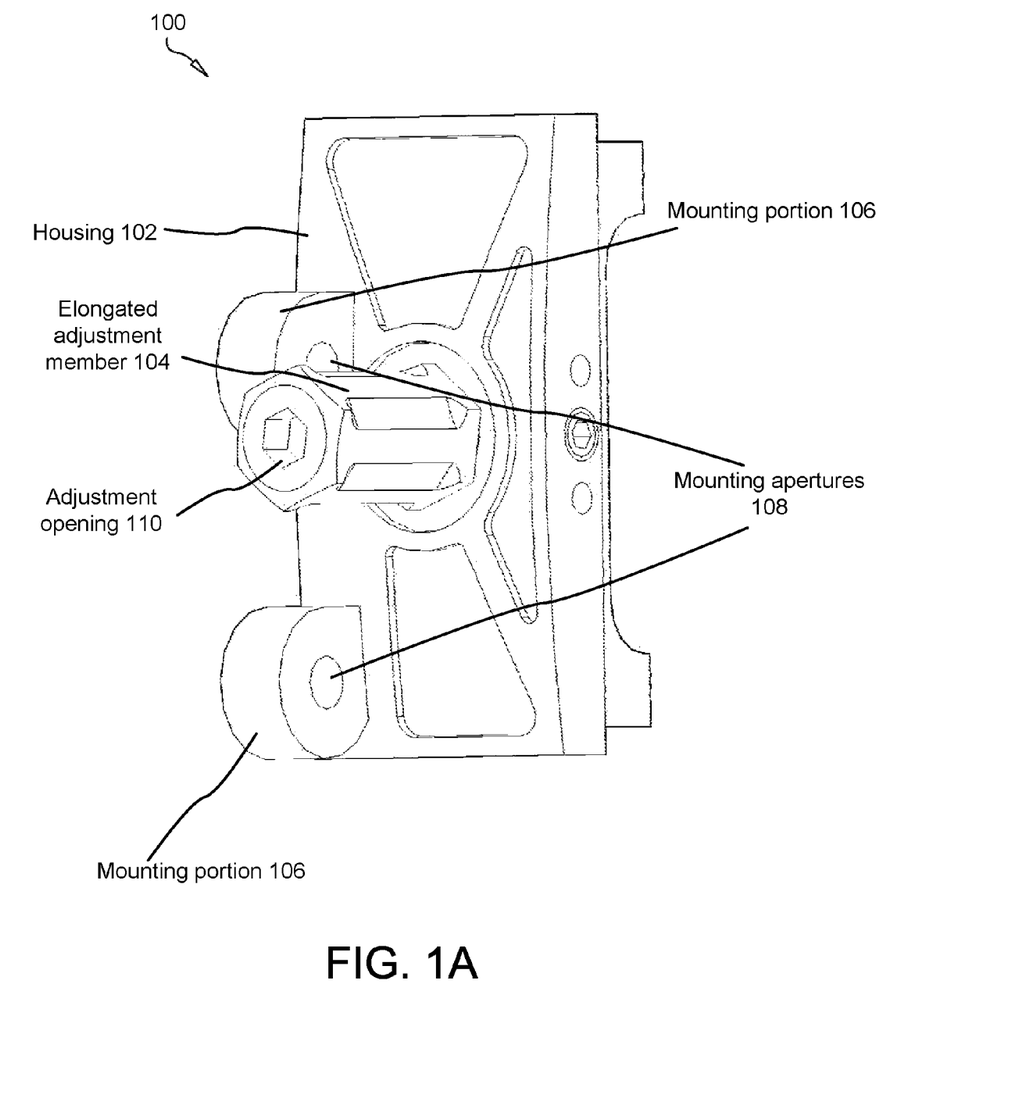
FIG. 1A illustrates a rearward perspective view of an exemplary integrated chain adjustment apparatus, in accordance with the present invention.

FIG. 1A illustrates a rearward perspective view of an exemplary integrated chain adjustment apparatus 100, in accordance with the present invention.

As referenced, an integrated chain adjustment apparatus 100 (or system) integrates with a cycle to facilitate adjustment of a chain, such as adjusting the slack on the chain. The integrated chain adjustment system 100 may be configured to facilitating access and preparation of the chain to adjust the slack on the chain. The integrated chain adjustment system 100 forms a unitary piece with the cycle, between the front and rear sprockets, helping to keep the wheel and chain in alignment, both during operation and while performing the chain adjustment. The system 100 is attached to or built into a cycle swing arm for enabling facilitated chain adjustment and providing attachments that add functionality to the cycle.

The integrated positioning of the present invention along a longitudinal axis of the swing arm helps retain the wheel and chain in the proper alignment, both during operation and maintenance. In this manner, the integrated chain adjustment system 100 displaces the need for typical chain adjustment tools and procedures, such as measuring alignment markers on the swing arm, creating maximum tension on the chain by pulling the rear wheel, and turning adjuster screws while the chain is taut.

Additionally, the integrated chain adjustment system 100 provides a mounting portion 106 for enabling attachment of auxiliary members that are useful for adjusting the chain and protecting the chain area. For example, a swing arm slider couples to the mounting portion 106 to form a barrier that protects the swing arm, the rear axle, and the chain from damage. The swing arm slider may remain attached to the integrated chain adjustment system during operation of the cycle, even while the chain is not being adjusted. Yet another auxiliary member that attaches to the mounting portion may include a rear stand hook which allows the rear section of the cycle to be raised with a stand during adjustment of the chain, or any maintenance. The integrated chain adjustment system has sufficient structural integrity to support the weight of the cycle in this manner. Those skilled in the art will recognize that adjusting the chain requires adjusting both sides of the rear axle. Therefore, the integrated chain adjustment system 100 may comprise both left and right embodiments configured to integrate on a brake side and a sprocket side of the cycle. Beneficially, the adjustment of the chain is simplified, as fewer tools and setup procedures are required for adjusting, or changing the chain on a cycle. Also, the functionality of the cycle is increased.

The integrated chain adjustment system 100 includes a housing 102 that is arranged to integrate with a swing arm, forming a unitary piece. The housing 102 serves as a spacer that locks the rear axle into a position relative to the swing arm. The housing 102 also enables additional functionality for the cycle by providing a mounting surface for auxiliary members. The housing 102 includes a front end, a rear end, a left end and a right end. The housing 102 is arranged between the front sprocket and the rear sprocket, often attaching to the swing arm from either the left or right end, depending on whether the integrated chain adjustment system 100 is on the brake side or sprocket side of the cycle. The mounted position of the housing 102 on the swing arm serves as a spacer that at least partially holds the rear axle in a position relative to the swing arm, and helps retain the chain at a predetermined slack. The housing 102 connects to the rear axle through a threaded adjustment fastener that adjustably regulates the distance between the housing 102 and the rear axle, as needed. The adjustment fastener passes through a threaded aperture in the rear axle for adjusting the relative distance therebetween.

In some embodiments, the housing 102 may also form a protective cover over the rear axle and sprocket area. Those skilled in the art will recognize that the cycle may move at high velocities, and physical contact to the chain, swing arm, and rear axle are common. After a jolt or physical engagement, the chain and rear axle are inclined to misalignment. The housing 102 provides at least partial protection from such damage by forming a protective encapsulation over the rear area of the cycle. Suitable materials for the housing may include, without limitation, steel, aluminum, metal alloys, and a rigid polymer.

In some embodiments, an elongated adjustment member 104, having a bolt like shape, extends outwardly from the front end of the housing. The elongated adjustment member serves to enable access to the adjustment fastener through an adjustment opening 110 which is defined by a terminal end of the elongated adjustment member 104. The elongated member 104 orients towards the front of the cycle, such that the adjustment opening can be accessed away from the rear axle. In this manner, the manipulations are performed away from the rear axle, which may be braced into an unsteady position during chain adjustment. The elongated adjustment member 104 is configured to enable the threaded adjustment fastener to at least partially pass through from the rear axle to the adjustment opening. The adjustment opening 110 enables access to a terminal end of the adjustment screw. A tool, such as an Allen wrench, ratchet, screw driver, and the like may be inserted through the adjustment opening 110 and rotated in a direction efficacious for tightening or loosening the chain.

In some embodiments, the housing 102 includes one or more mounting portions 106 that provides a surface for attachment of auxiliary members. The mounting portion 106 may define a pair of mounting apertures 110 sized and dimensioned to receive the auxiliary members. The auxiliary member may include a swing arm slider that forms a barrier that extends out from the left or right side of the housing, and helps protect the swing arm, the rear axle, and the chain from damage. The swing arm slider may remain attached to the integrated chain adjustment system during operation of the cycle, even while the chain is not being adjusted. Another possible auxiliary member may include a rear stand hook that extends approximately a few inches out from the housing 102. The rear stand hook mounts to the mounting portion, thus forming a stable foundation. A stand can be used to support the rear section of the cycle busing the rear stand hook as a pillar of support. The rear section of the cycle may be raised into this position with the rear stand hook during adjustment of the chain, or any other cycle maintenance. The rear stand hook and the attached housing have sufficient structural integrity to support the weight of the cycle in this manner.

Figure 1B:
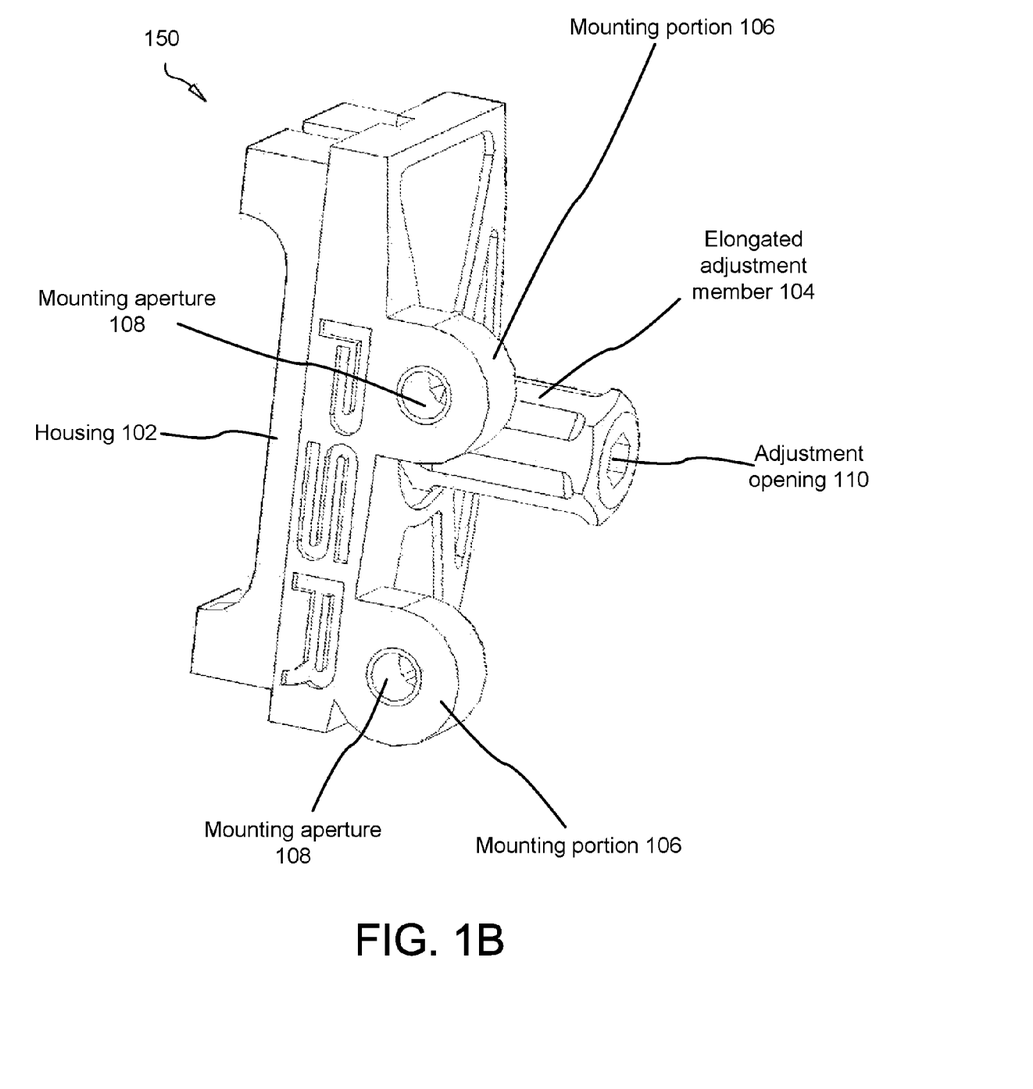
FIG. 1B illustrates a side perspective view of an exemplary integrated chain adjustment apparatus, in accordance with the present invention.

FIG. 1B illustrates a side perspective view of an exemplary integrated chain adjustment apparatus 150, in accordance with the present invention. FIG. 1B as shown.

Figure 2A:
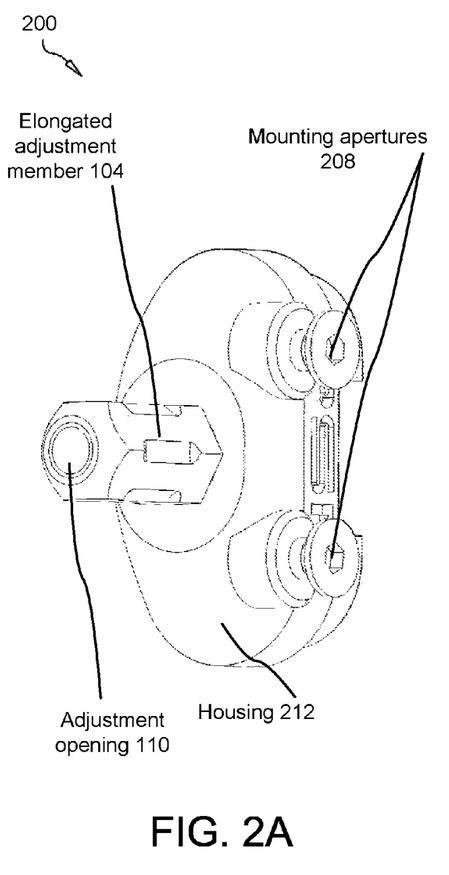
FIG. 2A illustrates a rearward-side perspective view of an exemplary integrated chain adjustment apparatus, in accordance with the present invention.

FIG. 2A illustrates a rearward-side perspective view of an exemplary integrated chain adjustment apparatus 200, in accordance with the present invention.

As shown, in various embodiments, the housing may comprise a convex outer surface.

Figure 2B:
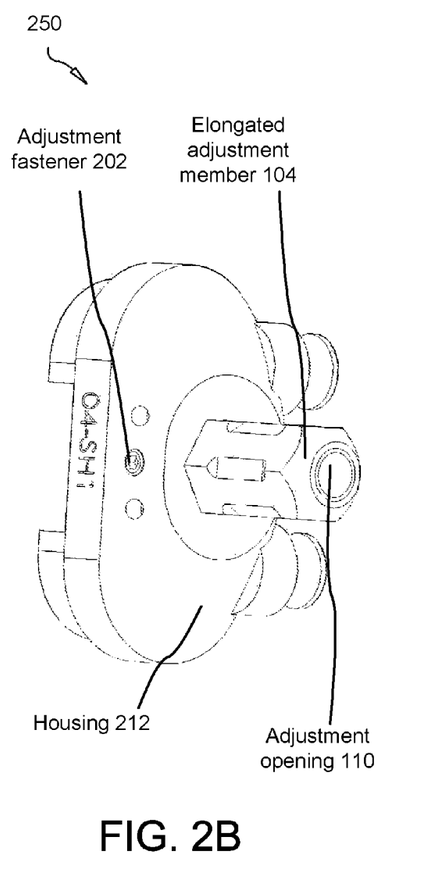
FIG. 2B illustrates a rearward-side perspective view of an exemplary integrated chain adjustment apparatus, in accordance with the present invention.

FIG. 2B illustrates a rearward-side perspective view of an exemplary integrated chain adjustment apparatus 250, in accordance with the present invention.

The housing 212 may define an aperture for providing access to an adjustment fastener 202.

Figures 3A, 3B:
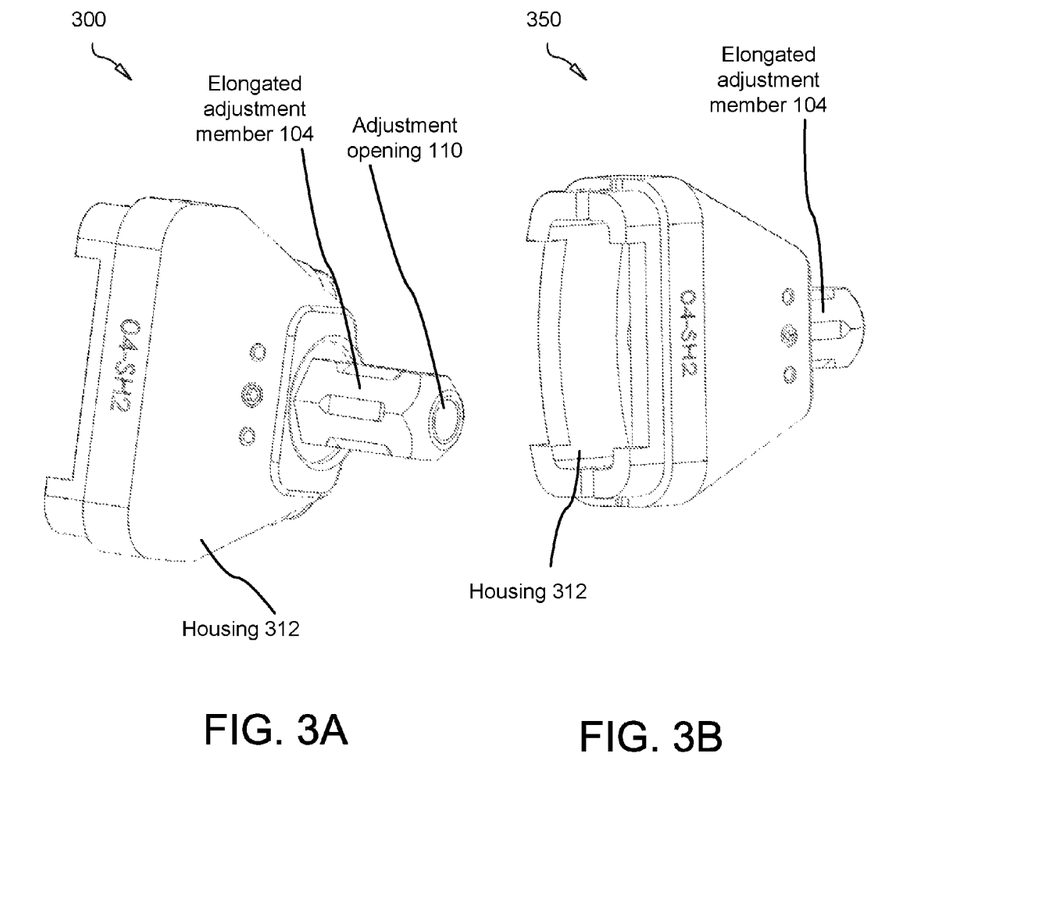
FIG. 3A illustrates a side perspective view of an exemplary integrated chain adjustment apparatus, in accordance with the present invention.
FIG. 3B illustrates a forward-side perspective view of an exemplary integrated chain adjustment apparatus, in accordance with the present invention.

FIG. 3A illustrates a side perspective view of an exemplary integrated chain adjustment apparatus 300, in accordance with the present invention.

As shown, the out surface of the housing 312 may taper as it travels rearwardly toward the elongated adjustment member 104.

FIG. 3B illustrates a forward-side perspective view of an exemplary integrated chain adjustment apparatus 350, in accordance with the present invention. FIG. 3B as shown.

Figure 4:
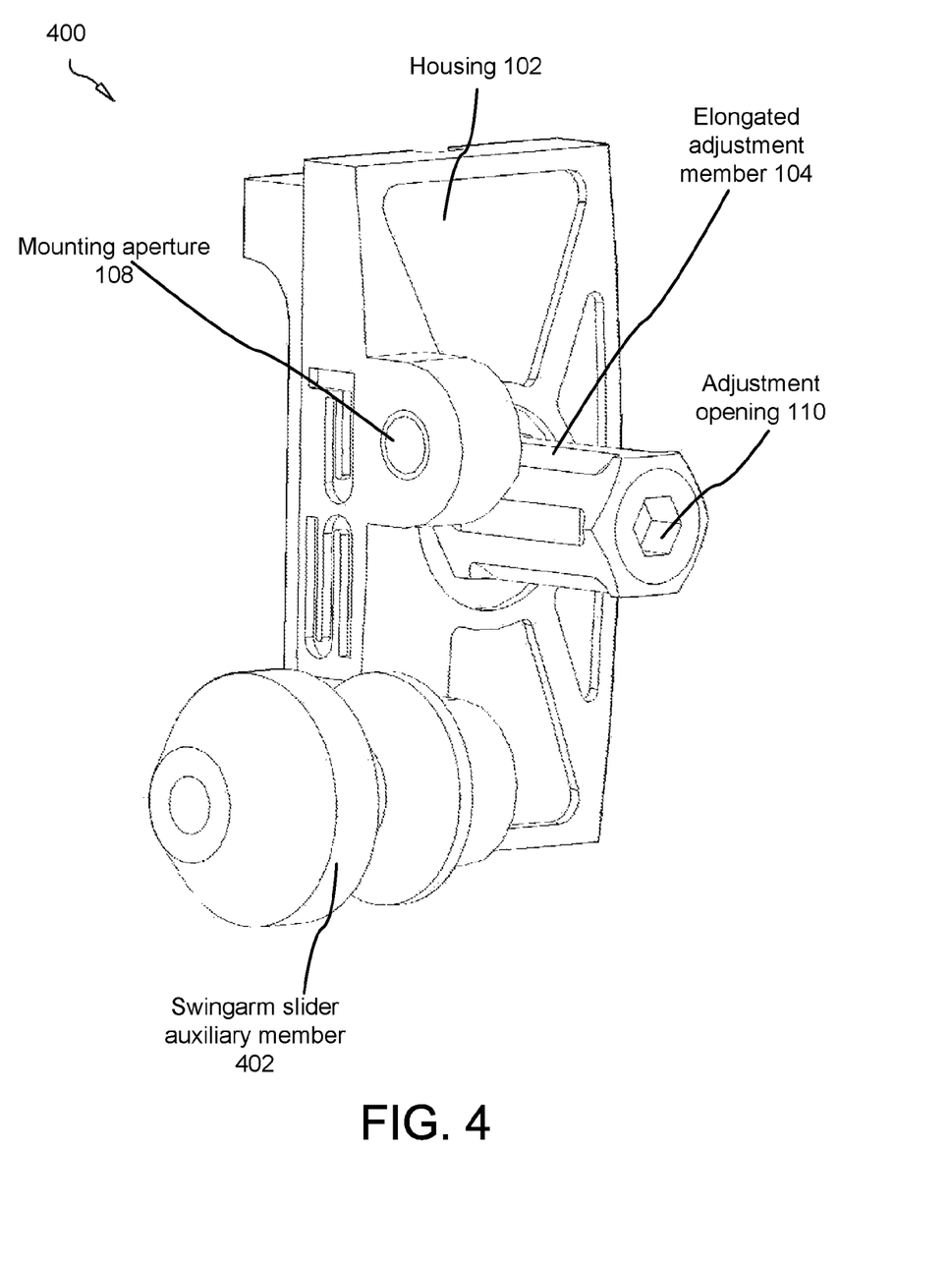
FIG. 4 illustrates a rearward-side perspective view of an exemplary integrated chain adjustment apparatus having a slider, in accordance with the present invention.

FIG. 4 illustrates a rearward-side perspective view of an exemplary integrated chain adjustment apparatus 400 having a slider, in accordance with the present invention.

A swingarm slider is detachably affixed to a mounting portion 106. The swingarm slide 402 is an auxiliary implement designs to protect the adjustment system 400 and swing arm from impact damage when the cycle impacts a ground surface.

Figure 5:
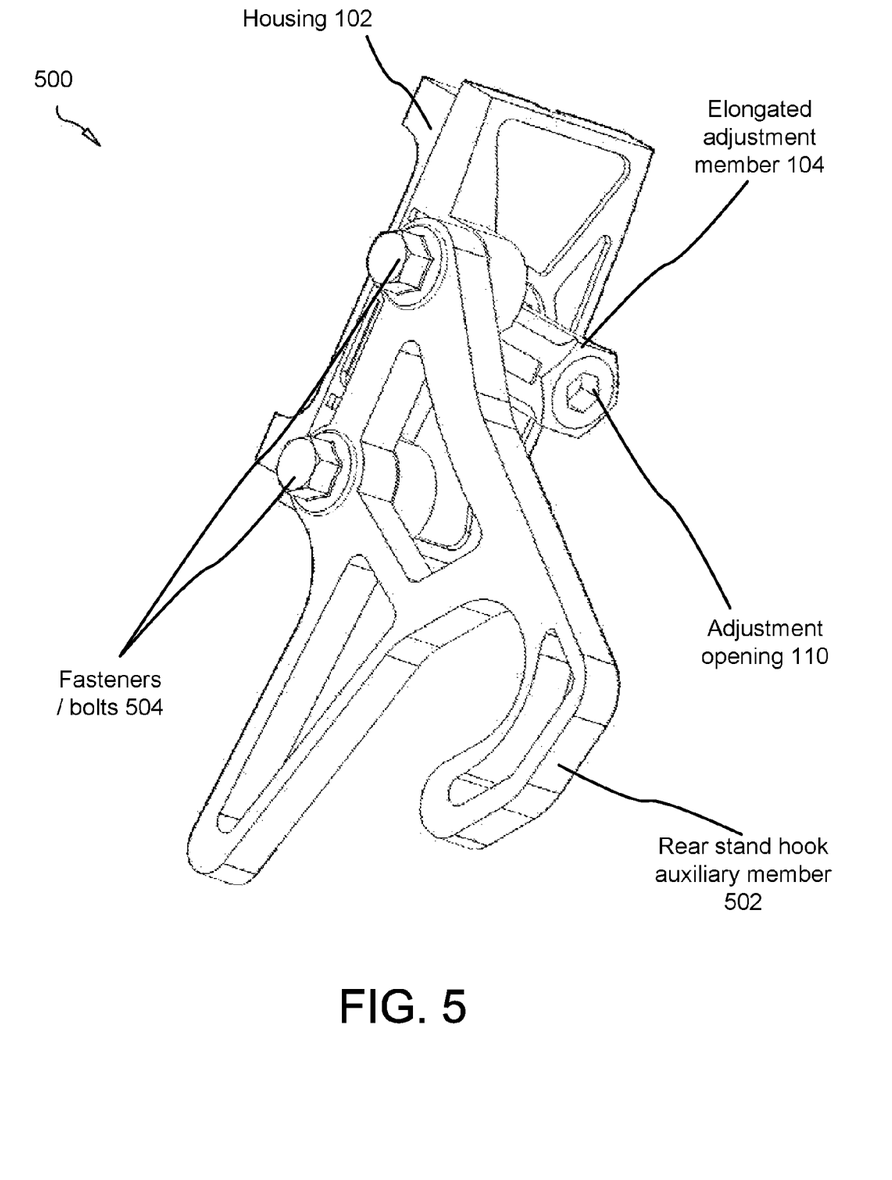
FIG. 5 illustrates a rearward-side perspective view of an exemplary integrated chain adjustment apparatus having a rearward stand, in accordance with the present invention.

FIG. 5 illustrates a rearward-side perspective view of an exemplary integrated chain adjustment apparatus 500 having a rearward stand, in accordance with the present invention.

A rear stand hook 502 may be affixed to the mounting portions 106. The rear stand 502 comprises an auxiliary implement.

Figure 6:
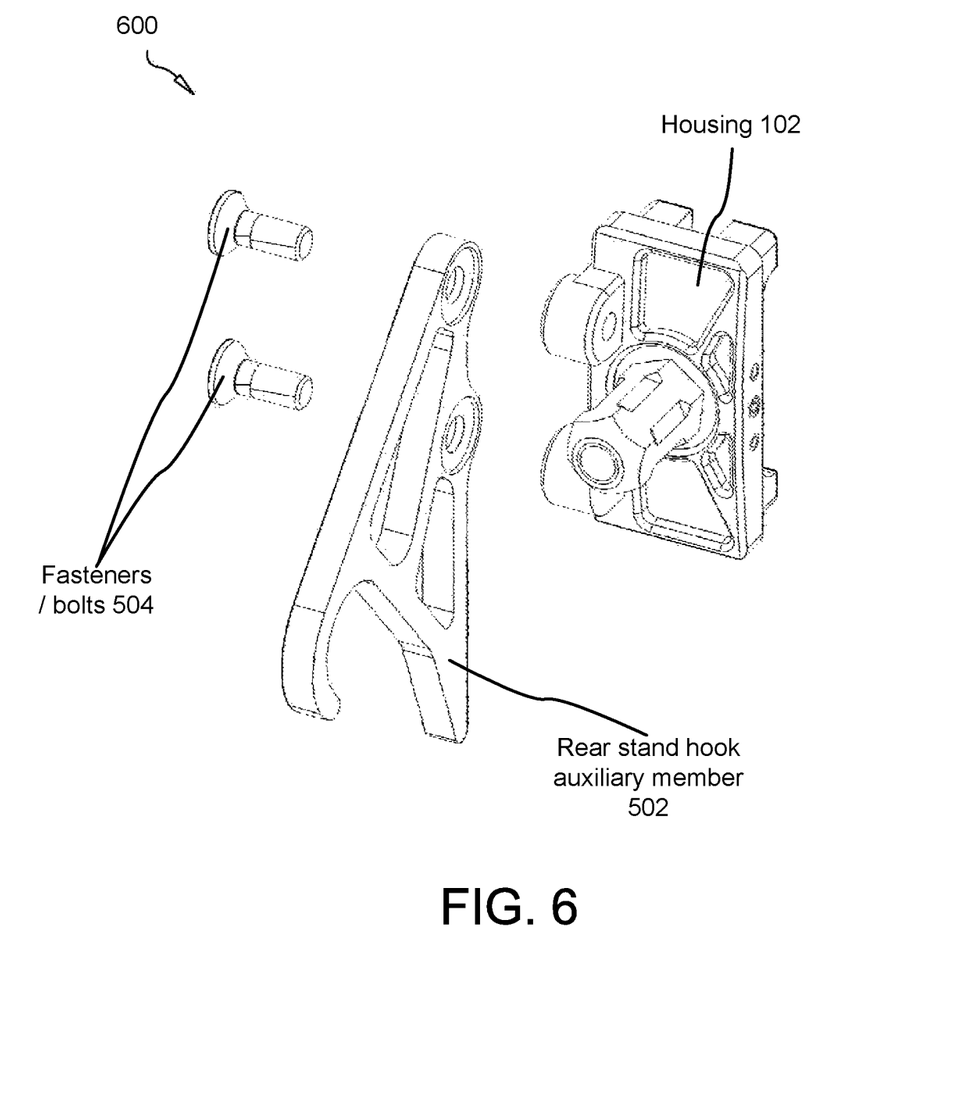
FIG. 6 illustrates a rearward-side perspective view of an exemplary integrated chain adjustment apparatus having a rearward stand, in accordance with the present invention.

FIG. 6 illustrates a rearward-side perspective view of an exemplary integrated chain adjustment apparatus having a rearward stand, in accordance with the present invention.

As shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A motorcycle swingarm end cap, the end cap comprising:
    a housing disposed to integrate with a swing arm of a motorcycle;
    the housing configured to retain a rear axle in a locked position relative to the swing arm, the housing operatively connected to the rear axle through an adjustment fastener, the adjustment fastener configured to adjust the position of the rear axle in relation to the swing arm for adjustment of tensile force on a chain,
    the housing further comprising two mounting portions extending rearwardly from the housing, the mounting portions each defining an aperture, the mounting portions collectively configured to enable attachment of at least one auxiliary member; and an elongated adjustment member disposed to extend from the housing, the elongated adjustment member configured to enable access to the adjustment fastener.

2. The end cap of claim 1, wherein the housing connects to the rear axle through the threaded adjustment fastener that adjustably regulates a distance between the housing and the rear axle, as needed.

3. The end cap of claim 1, wherein the housing forms a machined encapsulation that is welded onto the swing arm.

4. The end cap of claim 1, wherein the housing comprises a front end, a rear end, a left end, and a right end.

5. The end cap of claim 1, wherein the housing is configured to integrate on a brake side and a sprocket side of the motorcycle.

6. The end cap of claim 1, wherein the elongated adjustment member comprises a bolt shaped tube disposed to extend from the housing.

7. The end cap of claim 1, wherein the elongated adjustment member defines an adjustment opening configured to enable entry of a tool for engaging a terminal end of the adjustment fastener.

8. The end cap of claim 1, wherein the adjustment fastener comprises a threaded screw.

9. The end cap of claim 1, wherein the at least one auxiliary member comprises a swing arm slider configured to form a barrier adjacent to the housing for at least partially protecting the swing arm, the rear axle, and the chain.

10. The end cap of claim 1, wherein the at least one auxiliary member comprises a rear stand hook configured to enable a stand to support a rear section of the cycle.

* * * * *